(No Model.)

J. I. FLANAGEN.
HANDLE FOR THE COVERS OF MILK CANS, &c.

No. 510,780. Patented Dec. 12, 1893.

WITNESSES:
P. H. Nagle.
L. Douville.

INVENTOR
James I. Flanagen
BY
ATTORNEY.

UNITED STATES PATENT OFFICE.

JAMES I. FLANAGEN, OF PHILADELPHIA, PENNSYLVANIA.

HANDLE FOR COVERS OF MILK-CANS, &c.

SPECIFICATION forming part of Letters Patent No. 510,780, dated December 12, 1893.

Application filed January 21, 1893. Serial No. 459,104. (No model.)

*To all whom it may concern:*

Be it known that I, JAMES I. FLANAGEN, a citizen of the United States, residing in the city and county of Philadelphia, State of Pennsylvania, have invented a new and useful Improvement in Handles for Covers of Milk-Cans, &c., which improvement is fully set forth in the following specification and accompanying drawings.

My invention consists of novel means for bracing or strengthening the handle of a milk can or other cover, on the exterior of the side pieces of said handle as will be hereinafter set forth and definitely pointed out in the claim.

Figure 1:
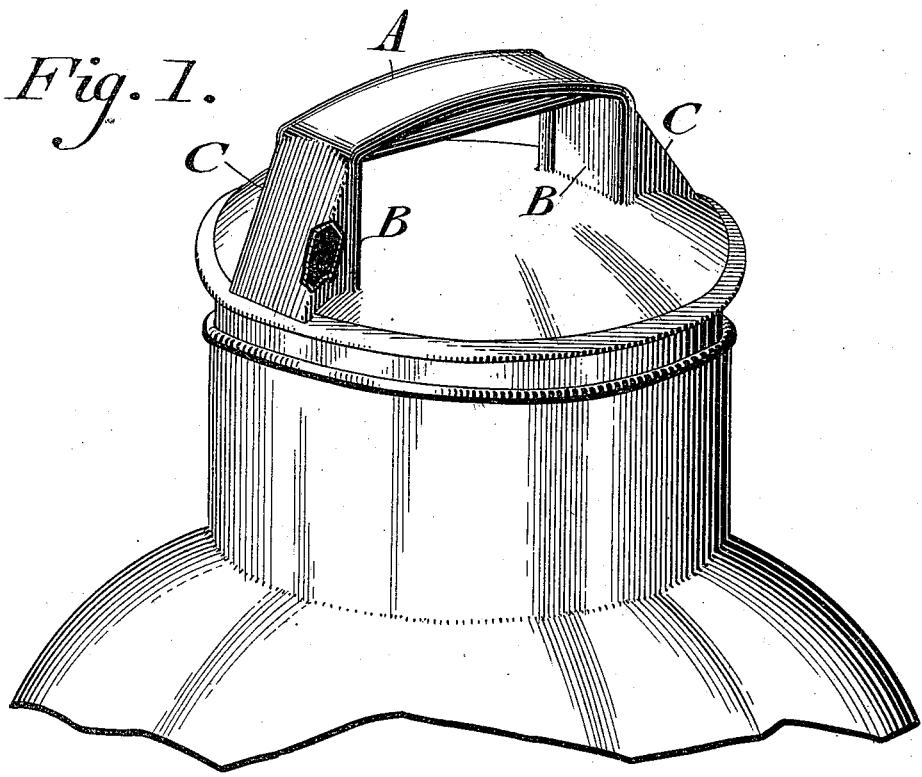
Figure 2:
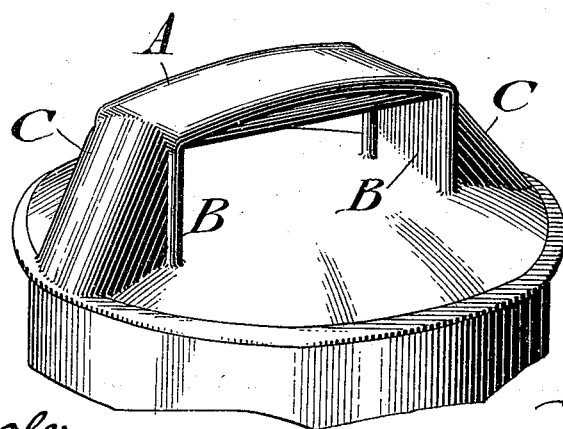

Figures 1 and 2 represent perspective views of the handle of a milk can cover embodying my invention.

Similar letters of reference indicate corresponding parts in the two figures.

Referring to the drawings: A designates a handle for the cover of a milk can, formed of a grip or cross piece curved upwardly at the center thereof and having a longitudinally extending brace on the under side of and closely fitting the same. On the upright portions or sides B of said handle, on the exterior thereof, are braces C which are firmly secured to said sides and the top and rim of the cover, the same being hollow or of somewhat semi-tubular form, it being seen that the handle is vastly strengthened on the sides thereof, and likewise rigidly attached to the cover, owing to the additional connections provided by said braces. The braces extend obliquely from the rim or top of the cover to the cross bar of the handle, whereby should blows be imparted to said braces they will be deflected or caused to glance off, and thus prevented from battering or otherwise materially injuring said braces.

In Fig. 1 the braces are angular in cross section, and in Fig. 2 they are curved, the result being the same in either case.

Having thus described my invention, what I claim as new, and desire to secure by Letters Patent, is—

The combination with the cover of a can, of braces of hollow form on the exterior of the side pieces of the handle of said cover, said braces joining the top cross bar and side pieces of said handle, and extending obliquely from the outer rim of the cover to said top cross piece, all substantially as described.

JAMES I. FLANAGEN.

Witnesses:
JOHN A. WIEDERSHEIM,
L. JENNINGS.